July 8, 1924.
A. S. HYDE
1,500,496
PRODUCTION OF WHEELS
Filed June 21, 1920    2 Sheets-Sheet 1
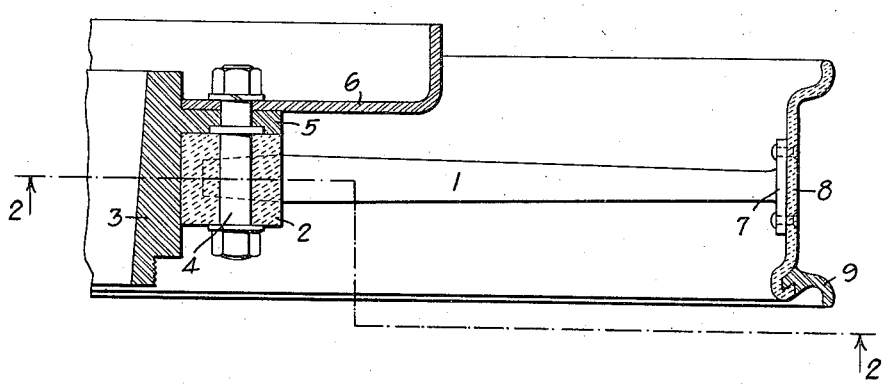
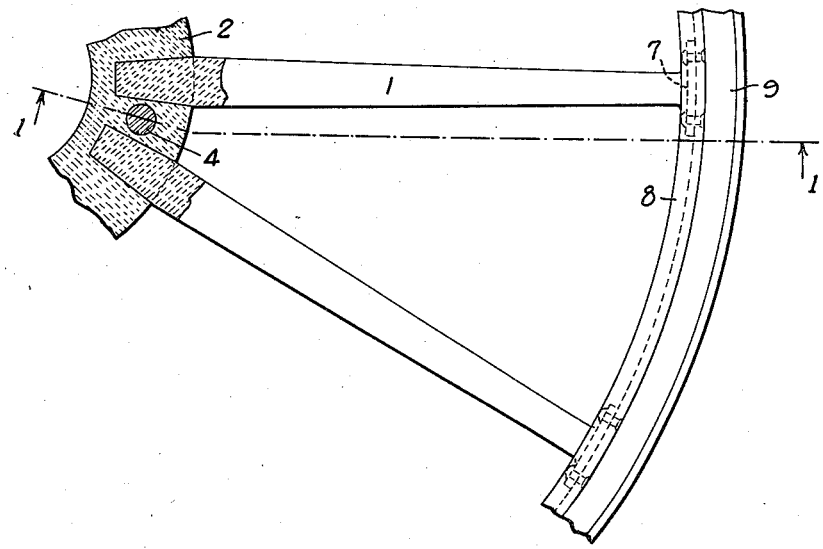
INVENTOR
ARTHUR S. HYDE July 8, 1924.
A. S. HYDE
PRODUCTION OF WHEELS
Filed June 21, 1920   2 Sheets-Sheet 2
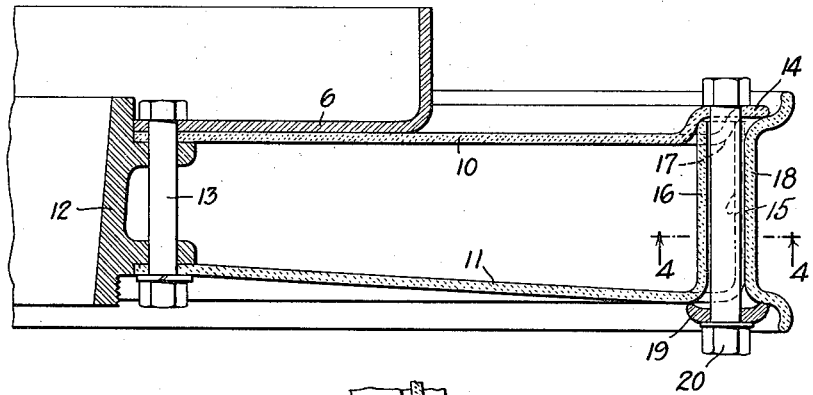
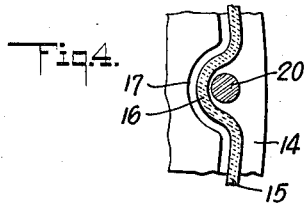
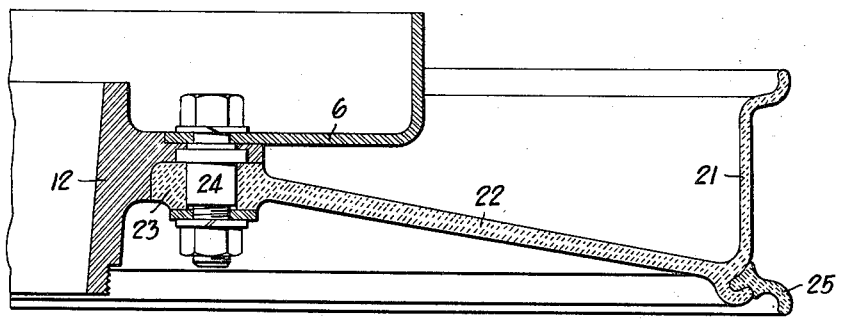
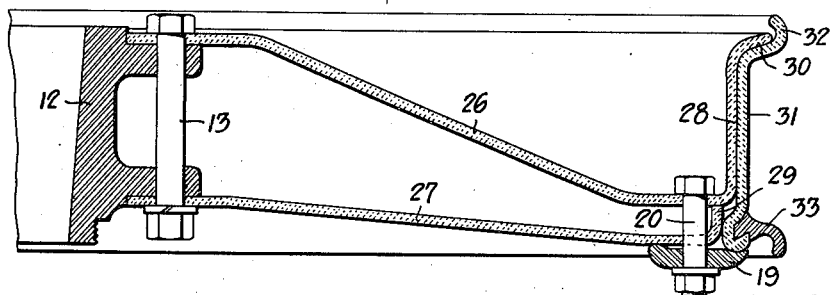
INVENTOR
ARTHUR S. HYDE
ATTORNEY Patented July 8, 1924.

1,500,496

UNITED STATES PATENT OFFICE.

ARTHUR S. HYDE, OF HARTFORD, CONNECTICUT, ASSIGNOR TO BAUSH MACHINE TOOL COMPANY, A CORPORATION OF MASSACHUSETTS.

PRODUCTION OF WHEELS.

Application filed June 21, 1920. Serial No. 390,404.

*To all whom it may concern:*

Be it known that I, ARTHUR S. HYDE, a citizen of the United States, and resident of Hartford, Conn., and whose post-office address is c/o Baush Machine Tool Company, Springfield, Massachusetts, have invented certain new and useful Improvements in the Production of Wheels, of which the following is a specification.

My invention provides a wheel, especially designed for automobiles and other vehicles, of a new material and structure, and a method of producing the same.

For many years aluminum and alloys thereof have been used to a greater or less extent, but no such alloy has been thought to be adapted for use in the making of wheels, having the necessary physical qualities to make a wheel which should be strong and durable against the compression and the lateral strains and shocks to which it is subjected and which could also be cast or forged and machined with the perfection required for good wheels and especially for the best automobile wheels.

I have found that there are certain alloys of aluminum which by appropriate methods of manufacture or manipulation and treatment can be made into wheels which will have the strength and reliability of the best steel or wooden wheels heretofore made with greater durability in good condition and much greater lightness at a reasonable cost. These qualities make such wheels greatly desirable for automobiles where strength and reliability is of the first importance and lightness is highly desired. A specific example of the composition and methods of manipulation which I prefer is the following:

An alloy is used consisting of aluminum 94%, magnesium 0.5% and the balance chromium, manganese and copper in varying proportions. This alloy is cast in appropriate ingots or blanks and then forged into the shapes desired, as hereinafter described in detail. The forging or otherwise working of the metal increases its tensile strength; as, for example, from 27,000 pounds per square inch to 36,000 or as high as 40,000 pounds.

The forged parts are then heated to a temperature approximating 500 to 525 degrees centigrade and quenched. It is found that this heat treatment increases the physical qualities very substantially. For example, an alloy having beforehand an ultimate tensile strength of 36,000 pounds per square inch will have its strength increased to 55,000 or 60,000 pounds. The elastic limit will be raised from 25,000 to 36,000 pounds per square inch, the elongation from 2 to 20% and the reduction under strain from 4 to 40%. The quality shown by these tensile tests is particularly valuable in enabling the wheel to resist the sudden and powerful lateral strains to which it is sometimes subjected in use. By this method there is produced a metal having approximately the strength of steel and the resistance to corrosion of aluminum and having a weight about one-third that of steel.

The heat treatment is not completely effective at once. It requires an aging of the metal for a period of one to five days in order to bring it to the desired physical characteristics. The aging of the metal after the heat treatment serves also to bring it to a condition in which it machines or cuts better than before. The machining may be done before the aging is complete, but it can be done better afterwards.

There are considerable variations possible in the composition of the aluminum alloy and in the proportions of the components. The important thing is to use such an alloy as will be capable of transformation by heat treatment into a metal of comparatively high strength and elastic limit, though it consists chiefly of aluminum which generally lacks these qualities, and though it weighs little more than aluminum.

The aluminum alloys above referred to and the heat treatment thereof have been known for a number of years, examples of the same being described in Wilm Patents No. 1,130,785 filed in 1911 and 1,261,987 filed in 1912. They have not been used however for wheels or the like although this period has seen numerous efforts to improve on the old wooden wheel particularly by the substitution of various unitary and built up constructions of steel; which are comparatively heavy and subject to rapid corrosion when not adequately protected.

I have discovered that wheels, both unitary and built up, may be made of the aforesaid aluminum alloy and will have not only the expected lightness but also a quite unexpected resistance to bending and a durability beyond that of the best previously known wheels of wood or steel. The heat treated alloy was found also to be capable of machining to make a wheel of perfect shape and balance as required for good practice.

The best results have been gotten with an extensive working of the alloy in making the blank, and the alloy referred to lends itself excellently to such operations. For example, in the making of the spokes of the wheel herein described I have rolled and forged the metal down to one-third or one-fourth of its original cross-section and this produced a dense, tough, fibrous structure excellently adapted for the designed use and well capable of being readily machined by ordinary steel cutters which could not possibly be used on hardened steel.

The accompanying drawings illustrate different embodiments of my invention.

Fig. 1 is a radial section on the line 1—1 of Fig. 2;

Fig. 2 is a section on the line 2—2 of Fig. 1;

Fig. 3 is a radial section of another style;

Fig. 4 is a detail on the line 4—4 of Fig. 3 omitting the wheel rim;

Figs. 5 and 6 are radial sections of other styles.

In Figs. 1 and 2 the wheel is built up somewhat in the manner of an ordinary wooden wheel, the parts however being made of the described aluminum alloy. The spokes 1 of aluminum alloy are separate and are driven or otherwise fastened in the central ring 2 of the same material which in turn is fastened to the hub 3, of steel (as shown) or of aluminum alloy, by means of bolts 4 passing through a flange 5 and attaching also the brake drum 6. The spokes at their outer ends are formed with flanges 7 which are riveted to the inner face of the rim 8 which is shown of aluminum alloy with a separate steel flange 9 but which can also be made entirely of alloy if desired.

The advantage in this construction lies in the fact that the spokes, which carry the greatest strain, can be separately forged, with a considerable increase in strength over cast metal. The central ring 2, the hub 3 and the rim 8 are also separate pieces which can be forged with a corresponding increase in strength. And all the parts can be easily machined to an accurate fit to each other.

This wheel is shown arranged to come off in its entirety from the hub 3 by withdrawing the bolts 4. Or it can be permanently fastened to the hub, using a demountable rim. The spokes may be of any desired shape in cross-section, such as the common round or oval shapes. And they might be fastened permanently in the hub 3 or in the demountable hub or ring 2.

They may in fact be formed in a variety of ways, though the separate construction illustrated is preferred where spokes are to be used.

In Figs. 3 and 4 the intermediate part of the wheel, that is the part between the hub and the rim, is made of two plates or discs 10, 11 of the aluminum alloy described. They are fastened to the steel hub 12 by means of bolts 13 passing through the plates and through flanges or ears on the hub and through the brake drum 6. The plate 10 is flat, bearing against the face of the brake drum, and has an offset flange 14 at its outer edge. The plate 11 is conical so as to provide for a rim of greater width than the hub and has on its outer edge a flange 15 (Fig. 4) extending to the flange 14 of the plate 10 and constituting the bearing portion of the inner rim. The flange 15 is bent to form grooves 16 at intervals and the flange 14 is shaped with sockets 17 engaging the ends of the grooved portions 16. A demountable rim 18 is fastened on the inner rim by engagement at one side with the flange 14 and at the opposite side with a ring 19 which is held in place by means of bolts 20 passing at intervals through the grooved portions 16 and registering openings in the flange 14. This wheel is made of parts which can be forged or pressed into shape and thus secures the superior strength due to this method of treatment.

Fig. 5 shows a wheel of which the rim 21 and conical web 22 are integral, constituting practically a one-piece wheel. The web is formed with a thickened portion or ring 23 at the center which is fastened by means of bolts 24 to the steel hub 12 and brake drum 6. One of the flanges 25 of the rim is separately cast in a groove in the rim proper 21. This flange 25 is indicated of aluminum alloy in Fig. 5 and of steel in Fig. 1. Either metal may be used.

Fig. 6 illustrates a design similar to Fig. 3 in that it uses two webs which are separate and adapted to be forged or pressed into shape. The webs 26 and 27 are spread apart at their center edges so as to better withstand bending strains which are greatest toward the center, and are fastened by a bolt 13 to flanges or ears on a steel hub 12. The conical webs are flattened near their outer edges to better accommodate the bolts which hold the demountable rim shown. The web 26 has an axially extending flange 28 and the web 27 has a similar flange 29, the former being again bent outward at its edge to form a transverse flange 30, these parts constituting the inner rim to which is fitted the outer demountable rim comprising a central portion 31 with an integral flange 32 at one side, and a flange 33 at the opposite side cast in a groove near the edge of the part 31. The flange 33 may be of steel as indicated or it may be also of aluminum alloy. The demountable rim is fastened as usual by means of a ring 19 held in place by bolts 20 passing through the flat portions of the webs.

The demountable rims add considerable weight to automobile wheels and for this reason I prefer to make them also of the aluminum alloy; though it will be understood that the wheel itself of this alloy is particularly useful with permanent rims or even with demountable rims of steel or partly of steel and partly of the alloy as illustrated. A separate application for patent is made for such demountable rims and they are not claimed in the present application except in combination with the wheel proper. A sepaarte application for Patent, No. 701,648, is made also for the construction of Figs. 1 and 2, in so far as it is distinguished from the other constructions herein described and to which the more specific claims herein are restricted. The combination is particularly useful because I have observed that the friction between the inner rim and the demountable rim where both are of this material is not noticeably greater than where they are of different materials; which is not true of most other materials. Generally the friction between two parts of the same material is greater than between two parts of different materials.

Though I have described with great particularity of detail certain specific embodiments of the invention, yet it is not to be understood therefrom that the invention is restricted to the particular embodiments disclosed. Various other constructions and designs of vehicle wheels are known and can be used with my invention and various modifications may be adopted without departing from the invention as defined in the following claims.

What I claim is:

1. A vehicle wheel having the supporting portion between the hub and the rim made of an aluminum alloy of the class described consisting mainly of aluminum and which has been worked and heat treated to increase its density, tensile strength and elastic limit.

2. A vehicle wheel having the supporting portion between the hub and the rim made of an aluminum alloy of the class described consisting mainly of aluminum, and a rim made in one piece with said supporting portion and which has been worked and heat treated to increase its density, tensile strength and elastic limit.

3. In the production of the supporting portion between the hub and the rim of vehicle wheels, the method which consists in making the same of an aluminum alloy of the class described and heat treating and forging or working the same to increase its density, tensile strength and elastic limit.

4. In the production of the rim and the supporting portion between rim and hub of a vehicle wheel, the method which consists in making the two parts in a single integral piece of an aluminum alloy of the class described and heat treating and forging or working the same to increase its density, tensile strength and elastic limit.

In witness whereof, I have hereunto signed my name.

ARTHUR S. HYDE.